United States Patent [19]

Koon et al.

[11] Patent Number: 5,580,512
[45] Date of Patent: Dec. 3, 1996

[54] METHOD FOR MAKING LOW COST ORIENTED COMPOSITE MOLDING COMPOUND

[75] Inventors: Robert W. Koon, Palos Verdes; Chi H. Sheu, Los Angeles; Brent R. Meredith, Fullerton, all of Calif.

[73] Assignee: Northrop Grumman Corporation, Los Angeles, Calif.

[21] Appl. No.: 418,745

[22] Filed: Apr. 7, 1995

[51] Int. Cl.$^6$ .............................. B29B 11/16; B29C 43/20
[52] U.S. Cl. .................. 264/438; 264/440; 264/108; 264/121; 264/137; 264/258; 264/324; 425/174.8 E
[58] Field of Search .................. 264/24, 324, 440, 264/108, 121, 137, 437, 438, 439, 258; 425/174.8 E, 174.8 R

[56] References Cited

U.S. PATENT DOCUMENTS

| | | | |
|---|---|---|---|
| 2,442,880 | 6/1948 | Schwartz | 264/24 |
| 2,902,720 | 9/1959 | Lachiche et al. | 264/108 |
| 2,974,369 | 3/1961 | Orthuber et al. | 264/24 |
| 3,082,138 | 3/1963 | Hjelt | 264/24 |
| 3,617,437 | 11/1971 | Bagg et al. | 264/108 |
| 3,626,041 | 12/1971 | Fields et al. | 264/24 |
| 4,271,112 | 6/1981 | Rossmann et al. | 264/86 |
| 4,591,400 | 5/1986 | Fradenburgh et al. | 156/80 |
| 4,752,202 | 6/1988 | Gomi et al. | 425/174.8 R |
| 4,937,032 | 6/1990 | Krone et al. | 264/255 |
| 4,949,921 | 8/1990 | Jarmon et al. | 244/123 |
| 5,017,312 | 5/1991 | Peters et al. | 264/24 |
| 5,026,444 | 6/1991 | Hollaway, Jr. | 156/62.2 |
| 5,093,050 | 3/1992 | Tepic | 264/23 |
| 5,158,824 | 10/1992 | Gill et al. | 428/284 |
| 5,192,387 | 3/1993 | Buckley | 156/275.5 |
| 5,196,212 | 3/1993 | Knoblach | 425/174.8 R |
| 5,198,167 | 3/1993 | Ohta et al. | 264/86 |
| 5,262,106 | 11/1993 | Graham et al. | 264/108 |
| 5,298,203 | 3/1994 | Yoshida et al. | 264/108 |

FOREIGN PATENT DOCUMENTS

| | | | |
|---|---|---|---|
| 2405994 | 8/1975 | Germany | 264/108 |
| 59-55719 | 3/1984 | Japan | 264/108 |

Primary Examiner—Jeffery R. Thurlow
Attorney, Agent, or Firm—Terry J. Anderson; Karl J. Hoch, Jr.

[57] ABSTRACT

A method for the manufacture of low cost "oriented" composite molding compounds using discontinuous fibers embedded in a resin matrix. The method involves the steps of aligning discontinuous fibers by use of a strong electric field while simultaneously inserting the fibers onto a polymer substrate comprised of an uncured resin matrix. A preferred embodiment includes the incorporation of a mesh or a glass capillary array located parallel and adjacent to the polymer substrate to further ensure fiber alignment. After the fibers are attached to the uncured resin matrix, the aligned fibers are forced to lie down parallel along the surface of the polymer substrate by mechanically forcing the fibers flat. The newly formed reinforced polymer films may then be stacked with the fibers of each ply oriented to achieve the desired mechanical properties, and then cured to produce an improved composite laminate which can be machined to form a high strength shaped member.

17 Claims, 2 Drawing Sheets

METHOD FOR MAKING LOW COST ORIENTED COMPOSITE MOLDING COMPOUND

BACKGROUND OF THE INVENTION

1. Field of the Invention

The present invention relates to a method for producing an improved composite molding compound. More particularly, the invention relates to a method and apparatus of manufacturing an "oriented" composite molding compound utilizing discontinuous fibers which are embedded in a resin matrix for machining and press molding applications.

2. Discussion of the Prior Art

There are currently a number of commercial and defense manufacturing companies that are using composite molding compounds as a low cost alternative to the use of continuous fiber reinforced "prepregs" (sheets of uncured resin impregnated onto continuous reinforcement fibers) for the manufacturing of composite structures in the aerospace and automotive industry. Additionally, it is well known in the manufacturing arts that molding compounds are also much better suited than continuous fiber reinforced prepreg for the fabrication of complex shaped parts.

However, the molding compounds used today are composed of fibers having a random orientation which results in sacrificing a significant level of mechanical strength when compared to reinforced prepregs composed of fibers which are "oriented" in a desired direction. As a result of the random orientation of the fibers which is inherent in commercially available molding compounds, a number of applications which would benefit from the process advantages of molding compounds are not realized due to its sacrifice in mechanical strength.

Therefore, a need exists to provide an inexpensive and reliable method of making a composite molding compound that exhibits the tailorable fiber orientations which lead to significant strength improvements. Furthermore, a need exists to provide a composite molding compound which can be either machined or inserted within a molding die, compressed and hardened to form a high strength shaped member.

The subject invention herein solves all of these problems in a new and unique manner which has not been part of the art previously. Some related patents are described below:

U.S. Pat. No. 5,158,824 issued to F. Gill et al. on Oct. 27, 1992.

This patent describes a wet mat process for producing a non-woven fibrous mat of generally random fiber orientation. The non-woven fibrous mat comprises built-up lines or strips of fiber directionally formed to enhance the strength and/or appearance of the mat. The wet mat process utilizes a continuous traveling forming belt which controls the thickness and orientations of the fibers by controlling the flow of the fiber material onto the forming belt by a vacuum technique.

U.S. Pat. No. 4,271,112 issued to F. Rossman on Jun. 2, 1981

This patent is directed to a process for producing a high strength, rotationally symmetrical component by appending short fibers of glass, carbon or like material in an organic solvent, and depositing the fiber material in a rotating sieve-like receptacle through a radially movable nozzle. The produced pre-form is impregnated with a matrix of resin and hardener and pressed into its final shape.

U.S. Pat. No. 5,196,212 issued to G. M. Knoblach on Mar. 23, 1993

This patent describes an apparatus for the production of composite material parts by aligning reinforcing fibers through application of electric fields. The fibers are in the form of rods, pre-impregnated with a matrix material or coated with a sizing, and aligned within a dielectric alignment fluid. The apparatus utilizes electrodes whose location creates an electric field thereby mimicking the stress lines exhibited by the final composite part when under stress. By use of the flux lines of the electric field, the reinforcing fibers are aligned in accordance with predetermined stress lines.

U.S. Pat No. 5,198,167 issued to T. Ohta et al. on Mar. 30, 1993

This patent is directed to a process for molding a fiber reinforced composite material with short fibers oriented in one direction. The process utilizes a slurry molding material having short fibers disbursed in a liquid and further uses pressing forces which are applied to the molding material from two directions substantially perpendicular to each other within the mold while simultaneously removing the liquid.

While the basic concepts presented in the aforesaid patents are desirable, the method and apparatus employed by each to produce a molding compound with oriented fibers are far too complicated to render them as an inexpensive means of achieving a reinforced polymer matrix composite having superior mechanical properties.

SUMMARY OF THE INVENTION

It is a primary object of the present invention to provide a method for manufacturing a low cost "oriented" composite molding compound by using discontinuous fibers embedded in a resin matrix and resulting matrix structure using a processing apparatus. The method comprises the steps of aligning a batch of discontinuous fibers by use of a strong electric field while simultaneously inserting the fibers into a target or polymer substrate composed of an uncured resin matrix in a direction normal to the surface of the substrate. The apparatus is a fixture for receiving a batch of fibers wherein the fibers are aligned and inserted into an uncured resin matrix by use of a strong electric field within a nonconductive alignment tank.

The process of aligning and transporting the fibers in an electric field is referred to as "flocking" and is a well-established textile technology. The basic flocking process and its apparatus is not a subject of this invention. However, flocking technology must be utilized and augmented such that it may be applied to reinforcing polymer composites as described. This revised flocking method and the subsequent process steps are the subject of this invention.

After the fibers are embedded in the uncured resin matrix, the aligned fibers are forced to lie down parallel along the surface of the polymer substrate by mechanically rolling the fibers flat thereby producing a raw prepreg stock having oriented discontinuous fibers. These newly formed reinforced polymer films are then stacked oriented with the fibers of each ply to achieve the desired mechanical properties, and then cured to produce an improved laminate which can be either machined or inserted within a molding die, compressed and hardened to form a high strength member of a variety of shapes.

The process for forcing the aligned fibers to lie down parallel along the surface of the polymer substrate may additionally be accomplished by use of air pressure blowing techniques instead of mechanically rolling. Alternatively, an electrostatic means may be used.

The present invention includes a novel apparatus for the manufacture of highly aligned discontinuous fibers embedded in a polymer substrate in a direction normal to the polymer substrate's surface. The apparatus comprises a mesh screen which is located parallel and substantially adjacent to the uncured resin matrix and defines a plurality of alignment apertures sized to allow the discontinuous fibers to pass through the mesh screen. By lifting the mesh screen after the insertion process has been completed, any unaligned fibers are simultaneously removed. Alternatively, a glass capillary array such as those used in night vision apparatus may be used in place of a mesh screen.

Accordingly, it is an object of the present invention to provide an economic manufacturing process for an "oriented" fiber composite molding compound of the above-mentioned type. Desired alignment of the discontinuous fibers within a composite laminate is achieved by stacking the plies in any desired construction and processing by means similar to that of standard composite prepregs.

A further object of the present invention is to provide a low cost composite manufacturing process similar to expensive manufacturing processes for producing traditional molding compounds that achieve improved results.

Still another object of the present invention is to provide a composite molding compound material having superior mechanical properties over traditional molding compounds.

It is a further object of the present invention to provide a method of aligning discontinuous fibers according to the stress lines in the composite material part when in use.

Still, yet another object of the present invention is to provide a method for aligning discontinuous fibers into desired orientations that produce a composite molding compound which is better suited for the fabrication of complex parts.

Yet, another object of the present invention is to provide a method for preferentially locating reinforcing fibers in locations of a composite material part where they are most needed.

Still, yet another object of the present invention is to provide an apparatus for aligning and inserting discontinuous fibers into a polymer substrate composed of an uncured resin matrix in a direction normal to the surface of the substrate.

Accordingly, it is an objective of the present invention to provide a low cost manufacturing method of using discontinuous fibers embedded in a resin matrix to produce a composite molding compound which provides an improvement in mechanical properties when compared to traditional molding compounds. The improvements afforded by this method will be set forth throughout the following description, claims and accompanying drawings.

BRIEF DESCRIPTION OF THE DRAWINGS

The above, as well as other, advantages of the present invention will become readily apparent to those skilled in the art from the following detailed descriptions of the preferred embodiment when considered in light of the accompanying drawings in which.

DESCRIPTION OF THE PREFERRED EMBODIMENTS

Figure 1:
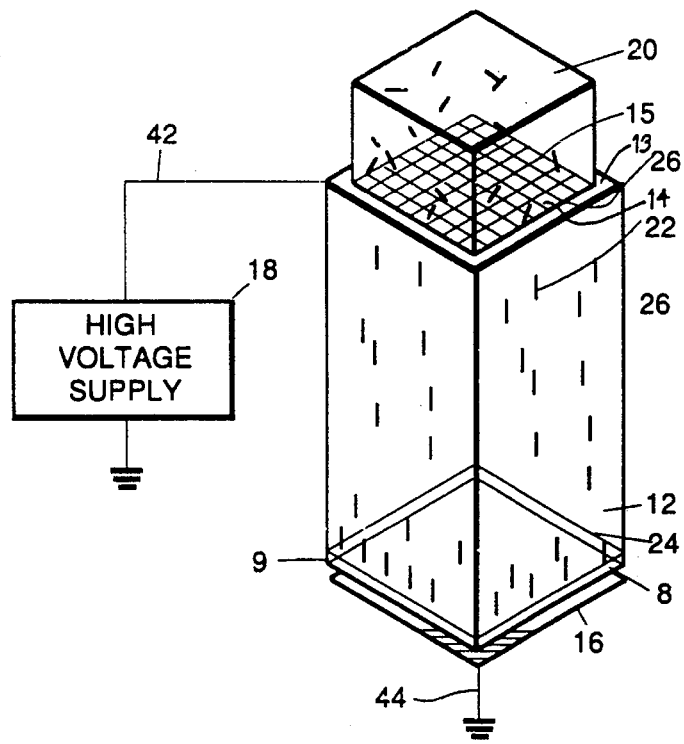
FIG. 1 is a diagrammatic view of the apparatus for using electric fields to align and attach discontinuous fibers onto an uncured polymer substrate.

Referring now to the drawings, wherein like reference numerals refer to like and corresponding parts throughout, in FIG. 1, there is illustrated an electric alignment apparatus 10 utilizing electric fields to align and embed discontinuous fibers 22 with respect to a polymer substrate 24. The alignment apparatus 10 includes an elongated rectangular alignment tank 12 made of a nonconductive material with positive and negative plate electrodes 14 and 16, which are shown substantially parallel and facing each other located along a top panel 13 and underneath a bottom panel 8 of the alignment tank 12, respectively. The alignment tank 12 also contains at the top panel 13 a fiber bin 20 surrounding the positive plate electrode 14 for placement of the discontinuous fibers 22 which are to be attached to the polymer substrate or film target 24 as more fully described below.

As shown in FIG. 1, and described above, positioned underneath the bottom panel 8 of alignment tank 12 is the negative plate electrode 16 which is located substantially parallel and adjacent to the bottom panel 8. The positive plate electrode 14 located at the top panel 13 of the alignment tank 12, comprises a mesh grid 15 defining a plurality of grid apertures 26 sufficiently large to allow passage of the discontinuous fibers 22 to fall through the apertures. The discontinuous fibers 22 are placed in the fiber bin 20 during the alignment portion of the process, and fall by force of an electric field in an aligned position, as will be more fully explained below. A source of high voltage 18 as is used during the basic flocking process is connected through wires 42 and 44 to the positive and negative plate electrodes 14 and 16, respectively.

As shown in FIG. 1, a polymer substrate or film target 24 composed of an uncured resin matrix is positioned onto the top 9 of bottom panel 8 of alignment tank 12, the high voltage source 18 is turned on and a plurality of discontinuous fibers 22 are then poured into or released within the fiber bin 20. The discontinuous fibers 22 fall through the grid apertures 26 of the positive plate electrode 14 and into the alignment tank 12, where they are subjected to an electric field (not shown) induced by the high voltage applied to the positive and negative plate electrodes 14 and 16, respectively. In the preferred embodiment, the voltage applied to the positive and negative plate electrodes 14 and 16 respectively, is a direct current voltage which is typically 50 kv or higher.

In the preferred embodiment, conductive carbon fibers 22 are used in the alignment process according to the present invention. Conductive carbon fibers 22 are preferred because of their characteristic high electrical conductivity and suitability for the alignment method of the present invention. By way of example, but not of limitation, the invention will also work with substitute fibers, as example, synthetic and natural fibers, metal filaments or the like, as long as such fibers have electrical characteristics which allow them to be aligned in accordance with the lines of flux generated by the high voltage electric field generated between the positive and negative plate electrodes 14 and 16, respectively.

The conductive nature of the discontinuous carbon fibers 22 causes them to behave as small electric dipoles in the presence of an electric field, wherein they align with the electric lines of flux induced within the alignment tank 12. As shown in FIG. 1, the relationship between the positive and negative plate electrodes 14 and 16 cause the fibers 22 to fall by electrostatic forces through the alignment tank in a substantially vertically oriented direction. The polymer substrate or film target 24 located along the bottom panel 8 of the alignment tank 12 comprises a tacky resin matrix which effectively receives and adhesively captures and holds the alignment of the discontinuous carbon fibers 22 in an upright position upon insertion into the polymer substrate or film target 24.

By using the above-described flocking process, the discontinuous carbon fibers 22 produce an accumulated mat 30 of erect fibers lying generally perpendicular to the polymer substrate or film target 24. In the preferred embodiment the accumulated mat 30 is composed of approximately 25 to 60 percent of the aligned discontinuous fibers 22. The discontinuous fibers 22 typically have a length far greater than the thickness of the polymer substrate or film target 24.

As shown in FIG. 1, the positive plate electrode 14 and negative plate electrode 16 are spaced apart a distance such that the field lines will be substantially parallel throughout the alignment tank 12, and sufficiently far apart to prevent the high voltage from arcing across the positive and negative plate electrodes 14 and 16, respectively. Those skilled in the art will recognize that many variations of locations of the plate electrodes 14 and 16 are possible within the scope of the present invention, including use of various conducting and insulating materials for both the alignment tank 12 and positive and negative plate electrodes 14 and 16, respectively. Such materials used in the alignment tank 12 and electrodes 14 and 16 are known to those familiar with the basic flocking process. Alternatively, the bottom panel 8 of the alignment tank 12 could be equipped with a conveyor belt so as to remove the accumulated mat 30 as it forms, thereby resulting in a continuous operation.

Figure 2:
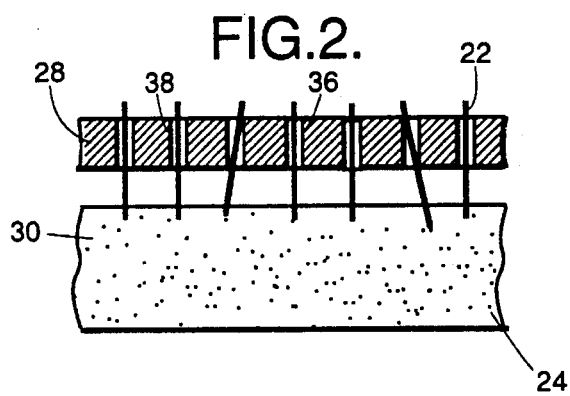
FIG. 2 is a cross-section of an apparatus for aligning fibers located adjacent to an uncured polymer substrate of the present invention.

In the preferred embodiment a mesh screen 28 is additionally used with the above-described flocking process to achieve a higher percentage of discontinuous fibers 22 being attached to the polymer substrate or film target 24 in a direction normal to its surface. Referring now to FIG. 2, the mesh screen 28 is located parallel and substantially adjacent to the polymer substrate or film target 24 and defines a plurality of alignment apertures 36 having sidewalls 38 or cross section of a thickness to allow the discontinuous fibers 22 to pass through the apertures 36 into the polymer substrate or film target 24. The width and location of the mesh screen 28 and length of the discontinuous fibers 22 are such that upon insertion of the discontinuous fibers 22 into the polymer substrate 24, the fibers 22 are located within and protrude out from the alignment apertures 36 of the mesh screen 28. Typically, the apertures are on the order of 2 to 5 times the diameter of the impinging fibers.

Figure 3:
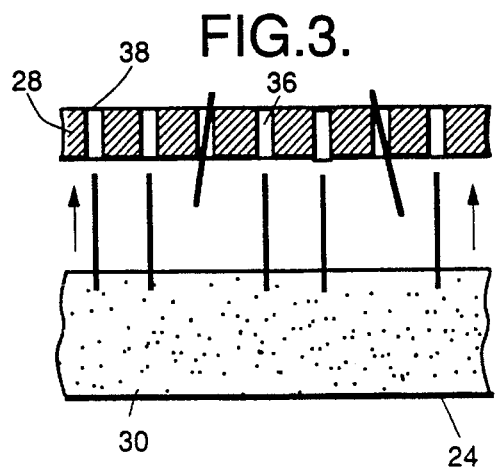
FIG. 3 shows the apparatus of FIG. 2 in use to illustrate one alignment technique of the present invention.

After the insertion process has been completed, the high voltage source 18 is turned off, and the polymer substrate or film target 24 and mesh screen 28 are removed together from the alignment tank 12. As shown in FIG. 3, the mesh screen 28 is lifted vertically or perpendicularly away from the polymer substrate or film target 24. Any unaligned discontinuous fibers 22 which are not in full contact with said film target 24 and are not well aligned are simultaneously removed. By use of the mesh screen 28, the accumulated mat 30 now has a higher percentage of aligned discontinuous fibers 22 oriented normal to and within the polymer substrate 24 than what has been achieved previously by any known alignment techniques. Although not shown, it may be envisioned that a glass capillary array may be used in place of the mesh screen 28 to achieve the same result.

Once the discontinuous fibers 22 are inserted and aligned into the accumulated mat 30 by either of the above-described methods, the accumulated mat 30 is removed to the next processing stage, wherein the discontinuous fibers 22 are reoriented to be parallel along the surface of the polymer substrate or film target 24. This reorientation process may be accomplished in one of several ways according to traditional methods. The methods include mechanically rolling the fibers flat, air pressure blowing techniques or use of electrostatic means to name a few.

Figure 4:
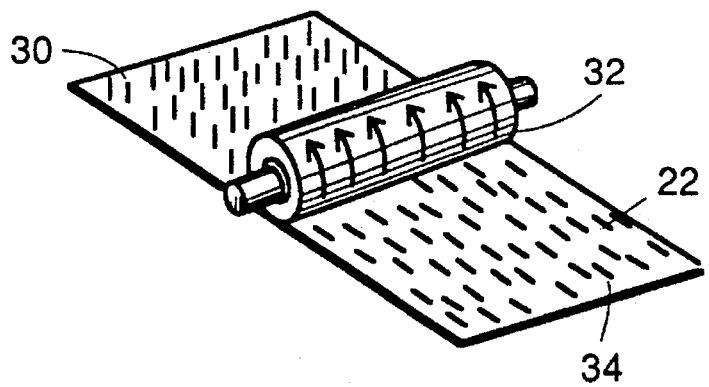
FIG. 4 is a schematic representation of one embodiment for realigning the fibers by mechanically rolling them in a direction parallel with the uncured polymer substrate.

As shown in FIG. 4, the discontinuous fibers 22 may be forced down in a parallel direction by using mechanical means comprising roller 32 which is rolled across the discontinuous fibers 22 of the accumulated mat 30. By moving and rolling the roller 32 across the accumulated mat 30, the discontinuous fibers 22 are reoriented from their vertically aligned position to a horizontal position aligned in a single direction in a plane defined by the polymer substrate or film target 24.

FIG. 4 is a representation of the mechanical laydown process where the fibers are pushed or otherwise forced to lay flat. Other means of pushing the fibers over may work equally as well.

Although not shown in the drawings, it may be envisioned that in lieu of mechanically reorienting the discontinuous fibers 22, they may be forced to lie down in a direction parallel to the polymer substrate or film target 24 by having air pressure applied along the surface of the accumulated mat 30. Additionally, a third technique could involve electrostatic alignment of the conductive fibers 22 as a low cost alternative to the mechanical forcing means.

In the preferred embodiment, using the mechanical, air pressure, or electrostatic process to reorient the discontinuous fibers 22 to be parallel with the surface of the polymer substrate or film target 24 may not be desirable if the fibers 22 to be used have a maximum length of greater than one-half inch. Whichever process is used to manufacture the raw prepreg stock, the resulting material is a low cost alternative as to what is currently being used in the art of manufacturing similar molding compound stock.

Figure 5:
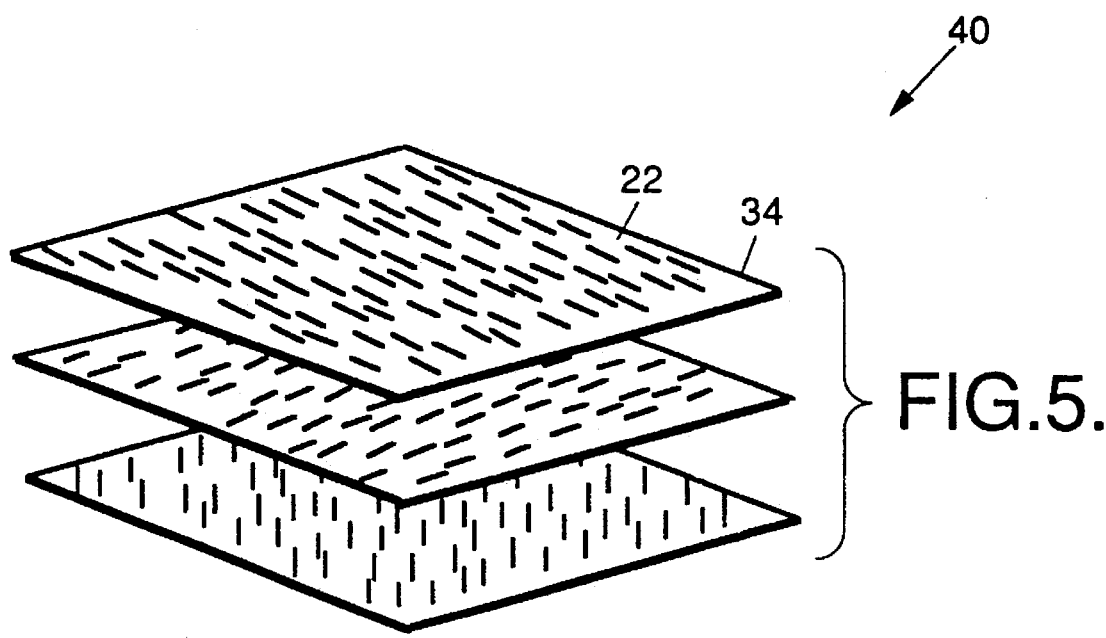
FIG. 5 is a schematic representation of one orientation of stacking the fiber mats before cure to produce the composite molding compound.

With respect to FIG. 4, once the mat 30 of discontinuous fibers 22 has been flattened to produce a raw prepreg stock 34, a composite laminate may be fabricated by stacking plies 40 of the raw prepreg stock 34 according to the desired alignment to achieve the mechanical properties for the final product to be produced. As shown in FIG. 5, in one embodiment, the accumulated mats 30 can be stacked such that the discontinuous fibers 22 are oriented 90 degrees with respect to each other, or some other desired relative orientation.

After the stacking of the raw prepreg stock 34 has been finished, the end composite structure 40 is cured in accordance with the time/temperature requirement of the matrix resin. For epoxy based matrices, a typical cure cycle involves four hours at 250° F. under 30 to 100 psig pressure. While FIG. 5 shows one example of built-up lines of fiber reinforcement, it should be apparent that the invention is not limited to such configurations and various designs may be produced including angles and other patterns of reinforcements using the above-described method in accordance with the present invention. After the curing process has been completed, the composite laminate can be machined the same way as a standard composite material.

There has been described and illustrated herein an improved method of manufacturing a composite molding compound utilizing discontinuous fibers embedded in a resin matrix which achieves better mechanical properties. While particular embodiments of the invention have been described, it is not intended that the invention be limited exactly thereto, as it is intended that the invention be as broad in scope as the art will permit. The foregoing description and drawings will suggest other embodiments and variations within the scope of the claims, all of which are intended to be included in the spirit of the invention as herein set forth.

What is claimed is:

1. A method of making a composite molding compound, comprising the steps of:
   (a) positioning a polymer substrate comprising uncured resin matrix in spaced relation from a source of discontinuous fibers;
   (b) transporting said fibers from said source to said substrate in an electric field established between said source and said substrate effective to orient said fibers in a direction generally normal to a surface of said substrate;
   (c) inserting respective ends of aligned fibers transported to said substrate into said surface such that the inserted fibers are oriented generally perpendicular to said surface and said ends are captured by said resin matrix;
   (d) moving the inserted fibers from the generally perpendicular orientation relative to said surface to an orientation in a plane substantially parallel to said surface; and
   (e) curing said substrate after said fibers have been inserted and moved to produce a ply.

2. A method according to claim 1, wherein the steps a through d of said method of claim 1 are repeated to produce a plurality of plies stackable upon each other prior to curing, wherein said fibers in each of said plies are aligned as desired, whereby each of said plies have complementary orientation of said fibers to provide enhanced material performance.

3. A method according to claim 1, wherein said fibers comprise carbon fibers.

4. A method according to claim 1, wherein said aligning said fibers in a direction normal to said surface is further accomplished by a mesh screen which is located between said source and said polymer substrate parallel and substantially adjacent to said polymer substrate, said mesh screen defining a plurality of alignment apertures having sidewalls sized to allow said fibers to pass through for insertion of said ends into said polymer substrate, including after insertion of said ends into said polymer substrate, moving said mesh screen away from said polymer susbtrate generally in said direction of fiber alignment whereby said fibers which are not in full contact with said polymer substrate and are not well aligned via the said mesh screen are simultaneously removed.

5. A method according to claim 1, wherein said aligning said fibers in a direction normal to said surface is further accomplished by a glass capillary array which is located between said source and said polymer substrate parallel and substantially adjacent to said polymer substrate, said glass capillary array defining a plurality of alignment apertures havng sidewalls sized to allow said fibers to pass through for insertion of said ends into said polymer substrate, including after insertion of said ends into said polymer susbtrate, moving said glass capilllary array away from said polymer susbtrate generally in said direction of fiber alignment whereby said fibers which are not in full contact with said polymer substrate and are not well aligned via the said glass capillary array are simultaneously removed.

6. A method according to claim 1, wherein said reorienting said fibers attached to said polymer substrate in a plane substantially parallel to said polymer substrate's surface is achieved by mechanically rolling said fibers by use of a roller.

7. A method according to claim 1, wherein said reorienting said fibers attached to said polymer substrate in a plane substantially parallel to said polymer substrate's surface is by air pressure applied along said plane substantially parallel to said polymer substrate.

8. A method according to claim 1, wherein said reorienting said fibers attached to said polymer substrate in a plane substantially parallel to said polymer substrate's surface is by applying an electrostatic field in and around the said polymer substrate.

9. A method according to claim 1, wherein said fibers have a length up to one-half inch when reorienting said fibers attached to said polymer substrate in a plane substantially parallel to said polymer substrate's surface.

10. A method for making a composite molding compound from a polymer substrate comprising uncured resin, comprising:
    positioning mesh means between a source of discontinuous fibers and the polymer substrate for allowing fibers moving from said source to said polymer substrate and oriented generally normal to said polymer substrate to encounter said polymer substrate, inserting respective ends of the aligned fibers that have moved through said mesh means into said polymer substrate such that the inserted fibers are oriented generally perpendicular to said polymer substrate and said ends are captured by said resin, and moving said mesh means away from said polymer substrate generally in said direction of fiber alignment after said fibers have been inserted therein, leaving said inserted fibers captured in the polymer substrate resin.

11. An method according to claim 10, including reorienting the fibers in the polymer substrate in a plane substantially parallel to the polymer substrate's surface by mechanically forcing over the fibers by use of a roller thereby producing a reinforced ply.

12. A method according to claim 10, including a first electrode comprising a mesh grid defining a plurality of grid apertures sufficiently large to allow passage of the fibers.

13. A method according to claim 10, including reorienting the fibers in the polymer substrate in a plane substantially parallel to the polymer substrate's surface by air pressure applied along said plane substantially parallel to the polymer substrate's surface.

14. A method according to claim 10, including reorienting the fibers in the polymer substrate in a plane substantially parallel to the polymer substrate's surface by applying an electrostatic field in and around the polymer substrate.

15. A method according to claim 11, wherein a ply of composite molding compound may be stacked with additional plies of the composite molding compound one on top of another other and cured in a relationship that produces a composite laminate having an orientation to achieve desired mechanical properties whereby the composite laminate may be machined to produce a finished article.

16. A method according to claim 10, wherein said mesh means comprises a glass capillary array.

17. A method of making a composite molding compound, comprising the steps of:

(a) positioning a polymer substrate comprising uncured resin matrix in spaced relation from a source of discontinuous carbon fibers;

(b) transporting said fibers from said source to said polymer substrate in an electric field established between said source and said substrate effective to orient said fibers in a direction generally normal to a surface of said polymer substrate, said electric field being established between positive and negative plate electrodes, said positive and negative plate electrodes having a substantially parallel relationship relative to said polymer substrate;

(c) passing said carbon fibers through a mesh screen located between said source and said polymer substrate parallel and proximate to said polymer substrate, said mesh screen defining a plurality of alignment apertures having sidewalls sized to allow aligned carbon fibers to pass through so as to encounter said substrate to insert respective ends of said aligned carbon fibers into said surface such that the inserted carbon fibers are oriented generally perpendicular to said surface and said ends are captured by said resin matrix, including moving said mesh screen away from said polymer substrate generally in said direction of fiber alignment after said ends are inserted whereby said carbon fibers which are not in full contact with said polymer substrate and are not well aligned via the said mesh screen are simultaneously removed;

(d) moving the inserted carbon fibers from the perpendicular orientation relative to said surface to an orientation in a plane substantially parallel to said surface; and (e) repeating steps (a) through (d) to produce a plurality of plies stackable upon each other prior to curing.

* * * * *